United States Patent [19]

Engel et al.

[11] Patent Number: 5,903,562

[45] Date of Patent: May 11, 1999

[54] MULTICASTING EMPLOYING PUBLICATION TITLE TO CREATE NUMERIC DESTINATION ADDRESS FOR COMPUTER NETWORK SYSTEM FRAME

[75] Inventors: Glenn R. Engel, Lake Stevens; Harry G. Plate, Snohomish, both of Wash.

[73] Assignee: Hewlett-Packard Company, Palo Alto, Calif.

[21] Appl. No.: 08/766,845

[22] Filed: Dec. 13, 1996

[51] Int. Cl.[6] .................................................. H04L 12/00
[52] U.S. Cl. ............................................................ 370/390
[58] Field of Search ........................ 395/200.66, 200.75, 395/824, 850; 370/39

[56] References Cited

U.S. PATENT DOCUMENTS

| | | | |
|---|---|---|---|
| 4,760,572 | 7/1988 | Tomikawa ................................. | 370/94 |
| 4,823,122 | 4/1989 | Mann et al. ....................... | 340/825.28 |
| 4,864,559 | 9/1989 | Perlman .................................... | 370/60 |
| 4,975,904 | 12/1990 | Mann et al. ........................... | 370/85.1 |
| 4,975,905 | 12/1990 | Mann et al. ........................... | 370/85.1 |
| 5,058,108 | 10/1991 | Mann et al. ........................... | 370/85.1 |
| 5,187,787 | 2/1993 | Skeen et al. ........................... | 395/600 |
| 5,245,607 | 9/1993 | Caram .................................... | 370/94.1 |
| 5,257,369 | 10/1993 | Skeen et al. ........................... | 395/650 |
| 5,339,392 | 8/1994 | Risberg et al. ......................... | 395/161 |
| 5,388,213 | 2/1995 | Oppenheimer et al. ................ | 395/200 |
| 5,740,170 | 4/1998 | Andou et al. .......................... | 370/390 |
| 5,761,193 | 6/1998 | Derango ................................ | 370/312 |
| 5,805,594 | 9/1998 | Kotchey et al. ........................ | 370/401 |

OTHER PUBLICATIONS

"Working Draft", Intel Corp., M. Andrews and E. Davison, Entire document, Internet—Draft, Oct. 1995, Expired Apr. 1996.

"Autonomous Decentralized Software and its Application", Kinji Mori, et al, Hitachi, Ltd., pp. 1056–1063; 1986 IEEE.

*Primary Examiner*—Lance Leonard Barry, Esq.
*Attorney, Agent, or Firm*—Erik A. Anderson

[57] ABSTRACT

A computer based network system includes a first node having a data value, medium for transmitting a network frame, and first and second node computers coupled to the medium. The first node computer is programmed to generate a numeric address based on at least a portion of a publication title, to load the data value and publication title into a data field of the network frame, to load the numeric address into a destination address field of the network frame, and to send the network frame on to the destination address via the medium. The second node computer is programmed to have the publication title associated with the data value, to generate the numeric address based on at least a portion of the publication title, to receive from the medium the network frame with this numeric address, to evaluate the received frame to determine whether the publication title used to generate the numeric address is in the data field of the network frame, to remove the data value from the data field of the network frame when the publication title used to generate the numeric address is in the data field, and to discard the network frame when the data field of the network frame lacks the publication title used to generate the numeric address. A computer-readable medium including a computer software program having a set of executable modules for transmitting data on a network via a network frame is also disclosed A computer based networking method is further disclosed.

15 Claims, 12 Drawing Sheets

ADDRESS SERVER LOOKUP TABLE

| Publication Title | Publisher(s) | Subscriber(s) | Publication Address |
|---|---|---|---|
| Temperature | A, D, and F | C, G, and H | Address 1 |
| Humidity | B and E | C and H | Address 2 |
| Temperature Set Point | C, G, and H | A, D, and F | Address 3 |
| Humidity Set Point | C and H | B and E | Address 4 |

Copyright © 1996 Hewlett-Packard Company

```
/*
 * genaddr.c - Subroutines to compute an IP multicast address from a title.
 *
 */

/* MULTICAST_RANGE defines the set of crc32 hash bits used in conjunction
 * with MULTICAST_BASE to generate an IP multicast address.  These constants
 * can be made into variables and can be changed to different values
 * depending on your needs.
 */
#define MULTICAST_BASE  0xe1000000    /* 225.0.0.0 */
#define MULTICAST_RANGE 0x000000ff    /*   0.0.0.255 */

/*
 * crc32 - a routine to compute a 32 bit cyclic redundancy check
 *         using a reflected polynomial of 0xedb88320L.
 *         A crc of "123456789" is 0xcbf43926.
 */
unsigned long crc32(const unsigned char *blk_adr, unsigned long blk_len)
{
    const unsigned long poly = 0xedb88320L;  /* reverse of 0x04C11DB7L */
    unsigned long crc = 0xffffffff;

/* sequence thru each byte of the input sequence */
    while (blk_len--)
    {
      int i;
      unsigned char data = *blk_adr++;

/* include each bit of the data, starting with the lsb */
      for (i=0; i < 8; i++)
      {
        if ((crc ^ data) & 1)
        {
          crc = (crc >> 1);
          crc ^= poly;
        }
        else
        {
          crc = (crc >> 1);
        }
        data >>= 1;
      }
    } return crc ^ 0xffffffff;
}

/* generateAddress - Generate a 32 bit address from a title.
 *         A 32 bit crc is computed from the title and then
 *         a portion of the 32 bit crc is retained which is then
 *         combined with our desired "base" multicast address.
 */
unsigned long generateAddress(const char *title)
```

FIG. 7A

Copyright © 1996 Hewlett-Packard Company

```
{
 unsigned long addr = crc32(title, strlen(title));
 addr = (addr & MULTICAST_RANGE);   /* mask off unwanted bits */
 addr = (addr | MULTICAST_BASE );  /* combine with our "base" address */
 return addr;
}
```

FIG. 7B

Copyright © 1996 Hewlett-Packard Company

```c
/*
 * publish.c - Publishes a temperature value to 'TEMP' once a second.
 *
 */ include <stdio.h>
include <string.h>
#include <unistd.h>
#include <sys/socket.h>
include <netinet/in.h> extern unsigned long generateAddress(const char *title);

const int   udpPubPort = 12345;
const char  pubTitle[] = "TEMP";
float pubValue = 12.3;

typedef struct
{
   char title[32];
   char msg[32];
} Message;

int main(int argc, char *argv[])
{
   struct sockaddr_in addr;
   Message message;
   int pubAddress;
   int fd;

/* create what looks like an ordinary UDP socket */
   if ((fd=socket(AF_INET,SOCK_DGRAM,0)) < 0) {
      perror("socket");
      exit(1);
   }

/* compute a 32 bit publication address based on our title */
   pubAddress = generateAddress(pubTitle);

/* set up destination address */
   memset(&addr,0,sizeof(addr));
   addr.sin_family=AF_INET;
   addr.sin_addr.s_addr=htonl(pubAddress);
   addr.sin_port=htons(udpPubPort);

/* construct a message to send */
   strcpy(message.title, pubTitle);      /* fill in the title */
   sprintf(message.msg,"%f", pubValue);   /* fill in the data */

/* now just sendto() our pubAddress ! */
   while (1)
   {
      sendto(fd,(void *)&message,sizeof(message),
```

FIG. 8A

Copyright © 1996 Hewlett-Packard Company

```
            0, (struct sockaddr *) &addr, sizeof(addr));
        sleep(1);
    }
    return 0;
}
```

Copyright © 1996 Hewlett-Packard Company

```c
/*
 * subscriber.c - receives data from 'TEMP' and prints it.
 */
include <stdio.h>
include <string.h>
#include <sys/socket.h>
include <netinet/in.h> extern unsigned long generateAddress(const char *title);

const int   udpPubPort = 12345;
const char  pubTitle[] = "TEMP";

typedef struct
{
   char title[32];
   char msg[32];
} Message;

int main(int argc, char *argv[])
{
   struct sockaddr_in addr;
   int fd, nbytes,addrlen, pubAddress;
   struct ip_mreq mreq;
   Message message;

/* create what looks like an ordinary UDP socket */
   if ((fd=socket(AF_INET,SOCK_DGRAM,0)) < 0) {
      perror("socket");
      exit(1);
   }

/* compute a 32 bit publication address based on our title */
   pubAddress = generateAddress(pubTitle);

/* set up destination address */
   memset(&addr,0,sizeof(addr));
   addr.sin_family=AF_INET;
   addr.sin_addr.s_addr=htonl(INADDR_ANY);
   addr.sin_port=htons(udpPubPort);

/* bind to receive address */
   if (bind(fd,(struct sockaddr *) &addr,sizeof(addr)) < 0) {
      perror("bind");
      exit(1);
   }

/* use setsockopt() to request that the kernel join a multicast group */
   mreq.imr_multiaddr.s_addr=htonl(pubAddress);
   mreq.imr_interface.s_addr=htonl(INADDR_ANY);
   if (setsockopt(fd,IPPROTO_IP,IP_ADD_MEMBERSHIP,&mreq,sizeof(mreq)) < 0) {
      perror("setsockopt");
      exit(1);
```

FIG. 10A

Copyright © 1996 Hewlett-Packard Company

```
    }

/* now just enter a read-print loop */
    while (1) {
      addrlen=sizeof(addr);
      if ((nbytes=recvfrom(fd,&message, sizeof(message),0,
                  (struct sockaddr *) &addr,&addrlen)) < 0) {
        perror("recvfrom");
        exit(1);
      }

/* Check to see if title matches what we are looking for */
      if (strcmp(message.title, pubTitle) == 0)
      {
        /* match found, print it out */
        printf("Received pub title %s with value %s\n",
            message.title, message.msg);
      }
    }
    return 0;
}
```

FIG. 10B

MULTICASTING EMPLOYING PUBLICATION TITLE TO CREATE NUMERIC DESTINATION ADDRESS FOR COMPUTER NETWORK SYSTEM FRAME

BACKGROUND AND SUMMARY

The present invention relates to a software program. More particularly, the present invention relates to a software program for computer network systems that utilizes at least a portion of a data publication title to create a numeric destination address for a computer network system network frame so that the network frame is sent directly to the destination address and received by one or more computer network system subscribers of the network frame without the use of a network address server.

A typical computer network system includes a network medium such as coaxial cable or twisted-pair cable, and a plurality of nodes, such as computers, terminals, printers, data storage devices, and servers that are connected to the media. The nodes communicate with one another according to an architecture model, such as the Open-Systems Interconnection (OSI) Model. The OSI Model includes seven different layers. These layers are: Physical, Data Link, Network, Transport, Session, Presentation Services, and Application.

A Media layer includes hardware or software used for connecting nodes together, such as the above-described coaxial cable or twisted-pair cable. The Physical layer is the connection interface between a node and the Media layer, such as RS-232C or IEEE 802.3. The Data Link layer is the mechanism used for data transfer across the Physical layer. The Data Link layer can be subdivided into a Logic Link Control (LLC) sublayer and a Medium Access Control (MAC) sublayer. The LLC sublayer governs the connection between end points via a protocol, such as Ethernet. The MAC sublayer assembles data to be sent into a frame and disassembles data before passing it to the LLC sublayer.

The Network layer is in charge of routing either through connection-oriented or connectionless-oriented means. This layer forms data packets and routes them from one node to another. Protocols used at this layer include X.25 and ISDN. The Transport layer is a network independent service provided to the Session layer. The Transport layer receives data from the Session layer and sends it to a destination. The Transport layer performs the reverse function when data is inbound from a target node. The Session layer is where connection points between nodes are established. Addresses used at this layer differ from those used at the Transport layer. Session layer addresses are used by programs or users. Transport layer addresses are used to establish Transport layer connections. The Session layer is responsible for establishing a connection for an application to use. The Session layer is also responsible for enforcing protocols between applications and reconnection in the event of a failure between two layers.

Translation of data passed between nodes is performed at the Presentation Services layer. The Presentation services layer also provides transformation of data exchanged between the Application layer and items above the Application layer. Finally, the Application layer provides services to applications so that the OSI capabilities can be accessed.

As noted above, Ethernet is a lower layer networking protocol in the OSI Model. Ethernet operates in one of three addressing modes: unicast, broadcast, and multicast. Unicast is a point-to-point technology which directs a message from one node to a second node on the network, with no other network nodes receiving this message. Broadcast addressing sends a network frame via the medium to all nodes connected to the network on which the network frame is transmitted. Each node on the broadcast network must read the frame and discard it if the network frame is unwanted. This requires Central Processing Unit (CPU) time which constitutes a significant portion of overall available CPU bandwidth for less sophisticated CPUs. The same issues arise for multicast addressing which Ethernet also supports. Multicast addressing is a specialized type of broadcast transmission in which a subset of the network nodes receive a network frame.

Multicast addressing attempts to overcome the disadvantages, noted above, with broadcast addressing by accessing only a subset of the nodes on a network. However, such multicast addressing must be managed by one of several techniques. One technique is to use a computer network system address server to manage the allocation of network addresses on the network. Such an address server utilizes a look-up table to determine which address to use. This table typically includes a list of network frame titles to which a corresponding publisher list and subscriber list are indexed. Use of an address server has the disadvantage of requiring each node to establish a dialogue with the address server to determine which addresses to use for the various frames.

Another disadvantage associated with multicast addressing is that an additional protocol needs to be developed to access the address server. A further disadvantage includes that additional network frames or traffic are present on the computer network system in order to talk with the address server. The address server is also a single point of failure for the computer network system. Additional complexity is required to deal with replacing a server while a network system continues to operate (e.g., hot standby or disk mirrors). Still further disadvantages include that additional network frames or network traffic are required to determine when an address is no longer in use and when a node powers up, it must talk to the address server, possibly overloading or swamping the computer system network if a large quantity of nodes are present.

The present invention is directed to alleviation of the above-described problems associated with broadcast and multicast network addressing. The present invention reduces the number of unwanted messages received by nodes, allowing lower performance CPUs to be used and providing greater available CPU processing time for other tasks. The present invention also eliminates the use of an address server which reduces extra equipment, eliminates address server network frames, and eliminates the single point of failure caused by the use of an address server. Furthermore, the present invention eliminates information processing by nodes caused by the address server protocol normally present.

An embodiment of the present invention is a computer based network system. The computer based network system includes a first node having a data value and medium, such as coaxial cable, twisted-pair cable, microwaves, etc., for transmitting a network frame. The computer based network system also includes a first node computer coupled to the medium and programmed to have a publication title associated with the data value. The first node computer is also programmed to generate a numeric address based on at least a portion of the publication title and to load the data value and publication title into a data field of a network frame. The first node computer is further programmed to load the numeric address into a destination address field of the network frame and to send the network frame on to the destination address via the medium. The computer based network system further includes a second node computer coupled to the medium and programmed to have the publication title associated with the data value. The second node computer is also programmed to generate the numeric address based on at least a portion of the publication title and to receive from the medium the network frame with this numeric address. The second node computer is further programmed to evaluate the received frame to determine whether the publication title used to generate the numeric address is in the data field of the network frame, to remove the data value from the data field of the network frame when the publication title used to generate the numeric address is in the data field, and to discard the network frame when the data field of the network frame lacks the publication title used to generate the numeric address.

The above-described computer based network system may be modified and include the following characteristics as described below. The first and second nodes of the computer based network system may each include a sensor. The network frames used on the computer based network system may include Ethernet frames.

The second node computer may also be programmed to have a second publication title associated with a second data value, to generate a second numeric address based on at least a portion of the second publication title, to load the second data value and the second publication title into a data field of the second network frame, to load the second numeric address into a destination address field of the second network frame, and to send the second network frame on to the second destination address via the medium. Such programming allows the second node to communicate with other nodes on a network, including the first node.

The first node computer may be programmed to have the second publication title associated with the second data value, to generate the second numeric address based on at least a portion of the second publication title, to receive from the medium the second network frame with the second numeric address, to evaluate the received second network frame to determine whether the second publication title used to generate the second numeric address is in the data field of the second network frame, to remove the second data value from the data field of the second network frame when the second publication title used to generate the second numeric address is in the data field, and to discard the second network frame when the data field of the second network frame lacks the second publication title used to generate the second numeric address. The second data value may include a control value that adjusts a set point of the first node, such as temperature. The computer based network system may additionally include a second node having the second data value. This second node may be a sensor.

Another embodiment of the present invention is a computer-readable medium including a computer software program having a set of modules executable by at least one computer for transmitting data on a network via a network frame. The software program includes a publication title module that generates a publication title associated with a data value. The software program also includes an address module that generates a numeric address for a destination address field of the network frame based on at least a portion of the publication title. The software program additionally includes a system call module that makes a system call to an operating system to load the data value and the publication title into a data field of the network frame, to load the numeric address into the destination address field of the network frame, and to send the network frame on to the destination address via a medium for transmitting the network frame.

The above-described computer-readable medium including the software program may be modified and include the following characteristics as described below. The software program may additionally include a receive module and an evaluation module. The receive module receives the network frame with the destination address from the media. The evaluation module evaluates the received frame with the destination address to determine whether the publication title used to generate the numeric address is in the data field of the network frame, removes the data value from the data field of the network when the publication title used to generate the numeric address is in the data field, and discards the network frame when the data field of the network frame lacks the publication title used to generate the numeric address.

The network frames may include Ethernet frames. The computer-readable medium may include things such as magnetic media, Read Only Memory (ROM), Random Access Memory (RAM), and CD ROM.

Another embodiment of the present invention is a computer based networking method. The computer based networking method includes the steps of creating a publication title associated with a data value and generating a numeric address based on at least a portion of the publication title. The method includes the additional steps of loading the data value and the publication title into a data field of the network frame and loading the numeric address into a destination address field of the network frame. The method further includes the step of sending the network frame on to the destination address via the network media.

The above-described method may be modified and include the following steps as described below. The above-described method may further include the steps of receiving from the media the network frame with the numeric address, evaluating the received frame to determine whether the publication title used to generate the numeric address is in the data field of the network frame, removing the data value from the data field of the network frame when the publication title used to generate the numeric address is in the data field, and discarding the network frame when the data field of the network frame lacks the publication title used to generate the numeric address.

Other objects, advantages, and novel features of the present invention will become apparent from the following detailed description when considered in conjunction with the accompanying drawings.

DETAILED DESCRIPTION OF THE DRAWINGS

Figure 1:
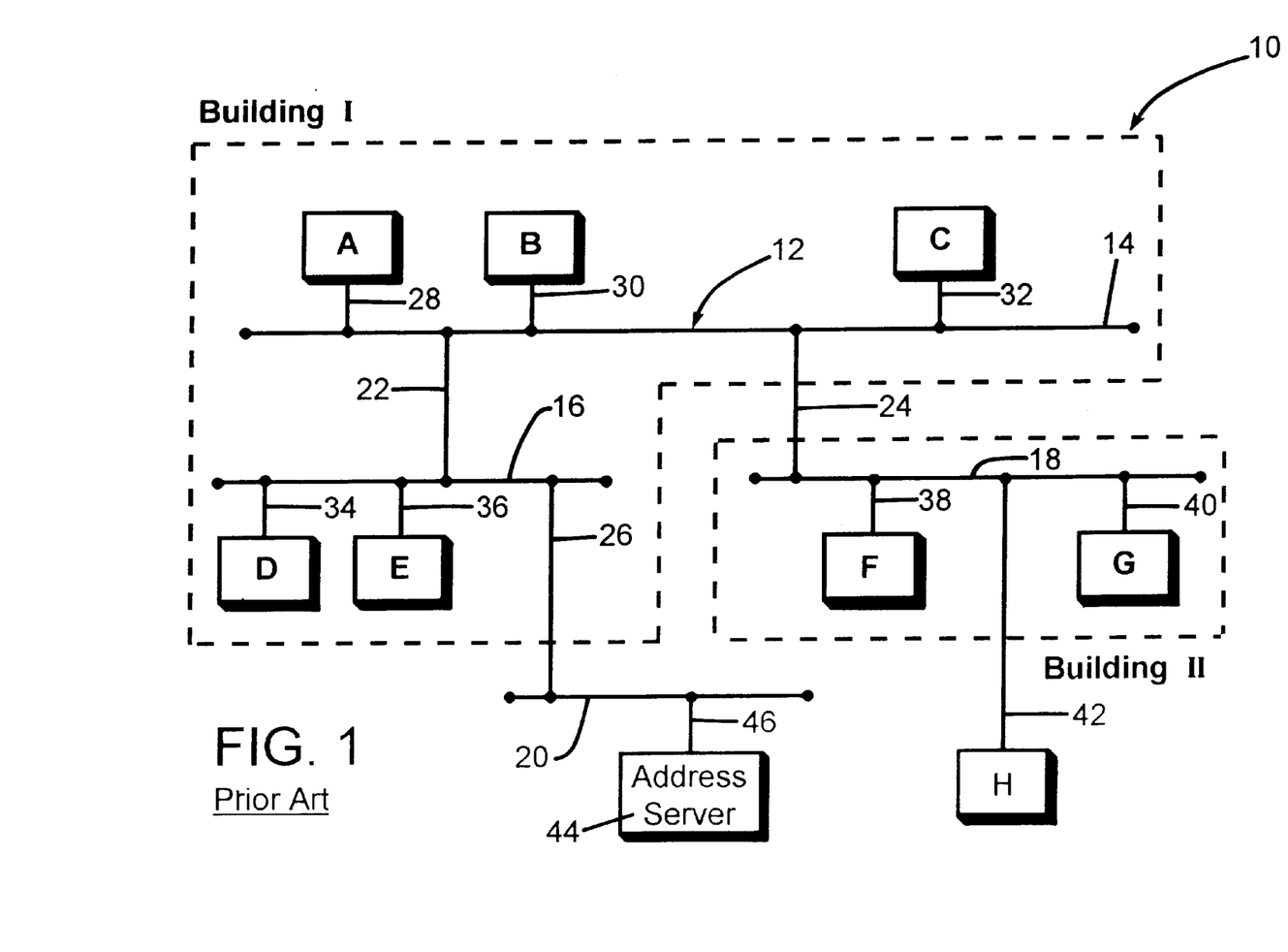
FIG. 1 is a diagram of a prior art computer network system.

A diagram of a prior art computer network system 10 is shown in FIG. 1. Computer network system 10 includes a medium 12, such as coaxial cable, that includes branches 14 and 16 located in Building I, branch 18 located in Building II, and branch 20 located at a location remote from Buildings I and II. Branches 14, 16, 18, and 20 are connected together on media 12 via lines 22, 24, and 26 that may also be made from coaxial cable. Nodes A, B and C are connected to branch 14 via respective lines 28, 30, and 32, nodes D and E are connected to branch 16 via lines 34 and 36; nodes F, G, and H are connected to branch 18 via respective lines 38, 40, and 42, and Address server 44 is connected to branch 20 via line 46. In this prior art example, Nodes A, D, and F are temperature sensors, Nodes B and E are humidity sensors; Node C monitors and controls temperature in Building I, Node G monitors and controls temperature in Building II, Node H monitors and control temperature in Buildings I and II, Node C also monitors and controls humidity in Building I, and Node H also monitors and controls humidity in Buildings I and II.

Computer network system 10 is based on an Open-System Interconnection (OSI) architecture model, discussed more fully below in connection with FIG. 2, and utilizes an Ethernet protocol, discussed more fully below in connection with FIG. 3.

Figure 2:
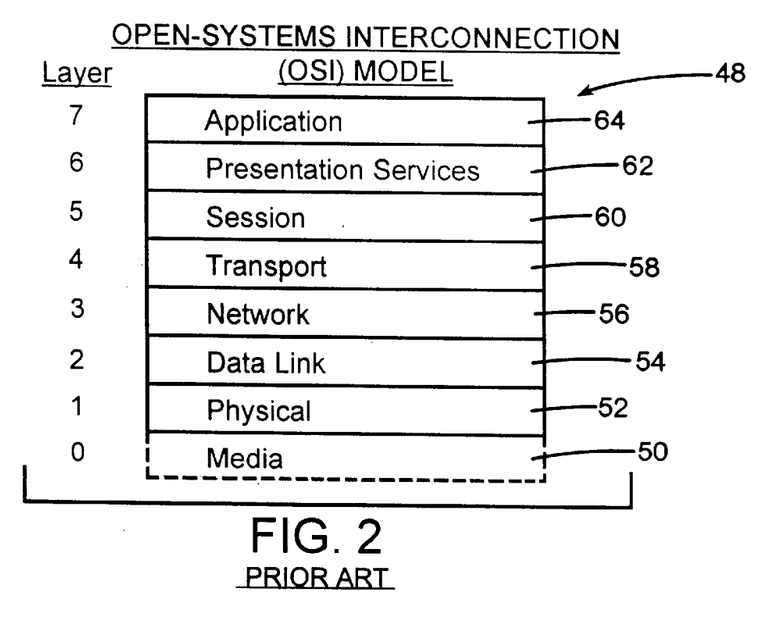
FIG. 2 is a diagram of an Open-Systems Interconnection (OSI) Model.

Referring to FIG. 2, an Open-System Interconnection (OSI) architecture model 48 is illustrated with eight layers (0–7) shown. Media Layer 0 is shown in dashed lines to indicate that, while not part of a standard definition of the OSI model, it is nonetheless present. OSI model 48 includes a Media layer 50 which includes hardware or software used for connection between computer network system nodes. Media examples include coaxial cable and twisted pair cable. OSI model 48 also includes a Physical layer 52 that is the connection or interface for nodes and the Media layer. Examples of physical layers include RS-232C and IEEE 802.3. Data Link layer 54 is the next layer for OSI model 48 and provides the mechanism for data transfer across the Physical layer. Examples of the Data Link layer include IEEE 802.3 and IEEE 802.5. Data Link layer 54 can be subdivided into Logic Link Control (LLC) sublayer and a Medium Access Control (MAC) sublayer. The LLC sublayer governs the connection between end points via a protocol, such as Ethernet. The MAC sublayer assembles data to be sent into a frame and disassembles data before passing it to the LLC sublayer.

Network layer 56 controls routing either through connection-oriented or connectionless-oriented means. Network layer 56 forms data packets and routes them from one node to another. Protocols used at this layer include X.25 and ISDN. Network layer 56 includes several sublayers including an internetworking sublayer that provides global message routing, an intranetworking sublayer that routes messages from one type of network to another, a harmonizing sublayer that provides an interface for adjacent sublayers, and an access sublayer that provides an interface to Data Link layer 54.

Transport layer 58 provides a network independent service to Session layer 60. Transport layer 58 receives data from Session layer 60 and sends it to one or more destinations. Transport layer 58 provides the reverse function when data is inbound from one or more nodes. Session layer 60 establishes a connection point between nodes. Addresses used at Session layer 60 differ from those used at Transport layer 58. Session layer 60 addresses are used by programs or users. Transport layer 58 addresses are used to establish Transport layer 58 connections. Session layer 60 is responsible for establishing a connection for an application to use. Session layer 60 is also responsible for enforcing protocols between applications and reconnection in the event of failure between two layers.

Translation of data passed between nodes is performed at the Presentation Services layer. Presentation services layer 62 also provides transformation of data exchanged between Application layer 64 and items above Application layer 64. Application layer 64 provides services to applications so that they can access OSI capabilities.

Figure 3:
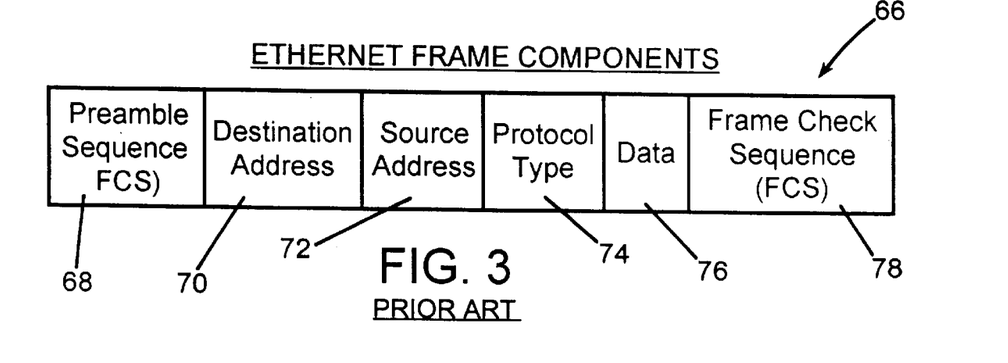
FIG. 3 is a diagram of an Ethernet frame.

The components of an Ethernet frame 66 used on network system 10 are shown in FIG. 3. Ethernet frame 66 includes a plurality of fields, discussed more fully below. Ethernet frame 66 includes a preamble field 68 of sixty-four encoded bits that Physical layer 52 uses for clock synchronization between circuits attached to a network medium. Destination address field 70 is a forty-eight bit address known as the Ethernet address. Source address field 72 is a forty-eight bit address of the sending node. Protocol type field 74 is a two byte field used to indicate the protocol type if multiple upper-layer protocols occupy the same physical medium. Data field 76 may contain between forty-six and fifteen hundred bytes of data. Finally, Frame Check Sequence (FCS) field 78 is a thirty-two bit field used to perform cyclical redundancy checking on all fields of Ethernet frame 66 except Frame Check Sequence field 78 itself.

As noted above, Ethernet is a lower layer networking protocol which may operate using broadcast addressing technology in which a network frame is sent via the medium to all nodes connected to the network on which the network frame is transmitted. Each node on a broadcast network has to read the frame and discard unwanted ones. This requires Central Processing Unit (CPU) time which can constitute a significant portion of overall CPU bandwidth for less sophisticated CPUs. The same issues arise for multicast addressing which Ethernet may also use. Multicast addressing is a specialized type of transmission in which a subset of network nodes receive a network frame.

Multicast addressing attempts to deal with the above-noted disadvantages associated with broadcast addressing through the use of an address server such as address server 44 of network 10 shown in FIG. 1. Address server 44 manages the routing of network frames via an address server look-up table 80 like that shown in FIG. 4. Address server look-up table 80 includes four columns respectively labeled Publication Title, Publisher(s), Subscriber(s), and Publication Address. The Publication Title column contains the names of various publication titles of network frames present on network system 10. In this example, one publication title is Temperature which represents the value of temperatures sensed at nodes A, D or F. Network frames containing temperature publication titles are sent to nodes C, G, and H, rather than being sent to all nodes on network system 10. Nodes C, G, and H determine whether the data in the frame is for them. If not, the network frame is discarded. Address server 44 looks up the address for publication title Temperature, in this case Address 1, to determine where to send network frames containing temperature publication titles, in this case nodes C, G, and H.

Table 80 also includes the publication title Humidity for sensed humidity values measured by nodes B and E which are listed in column two of table 80 as the publishers of this information. Network frames containing humidity data are sent to nodes C and H which determine whether this information is of interest to them. As shown, in FIG. 4, address server 44 sends network frames with humidity data to Address 2 which, in this case, includes Nodes C and H.

Figure 4:
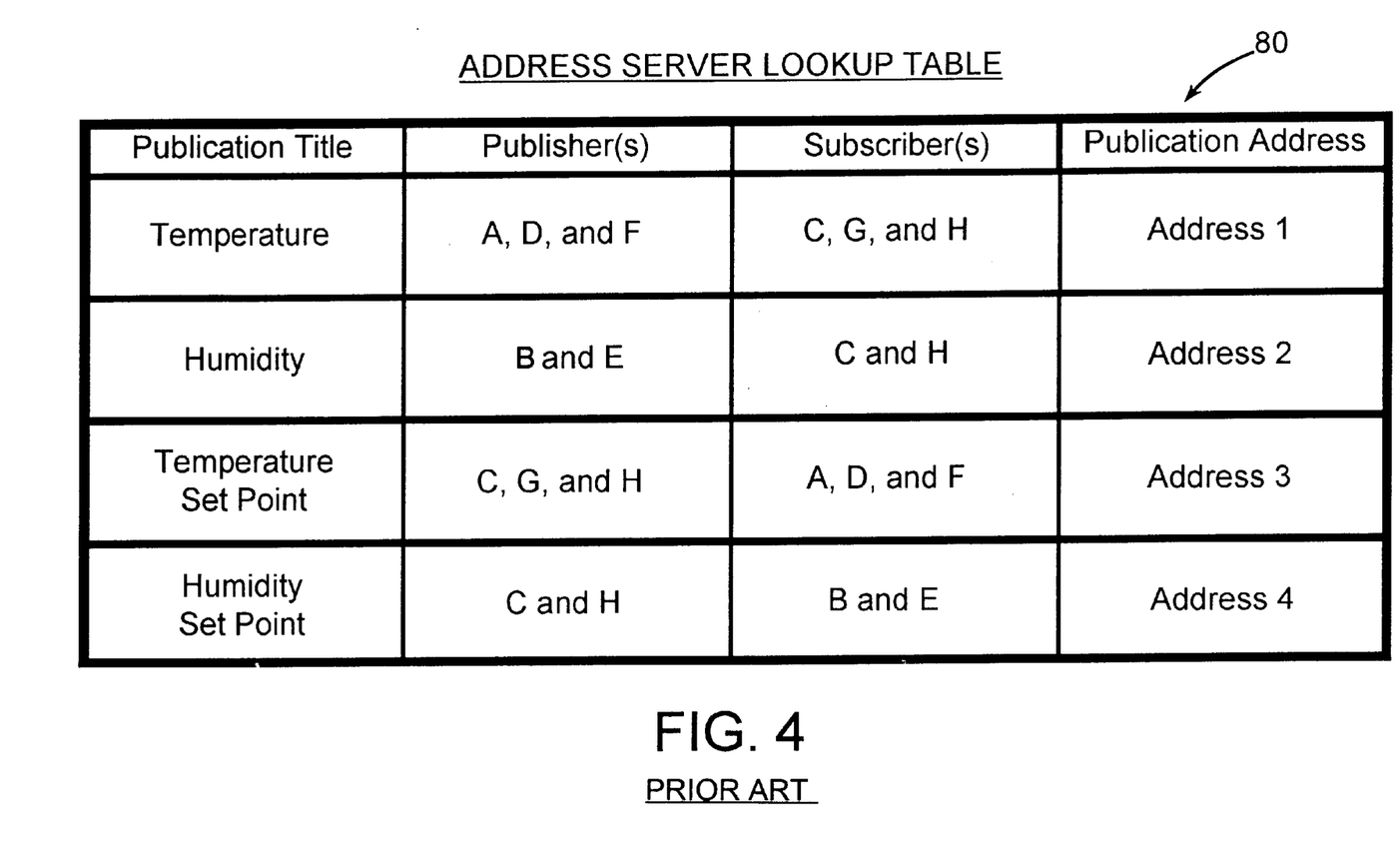
FIG. 4 is a diagram of a prior art address server look-up table.

Table 80 additionally includes a Temperature Set Point publication title generated by nodes C, G or H to adjust the temperature set point at respective nodes A, D and F. Network frames containing Temperature Set Point publication titles are sent to nodes A, D and F which determine whether this information is of interest to them. Address server 44 uses Address 3 for this routing. Finally, as an example, table 80 is shown as including a Humidity Set Point publication title generated by publisher nodes C or H to adjust the humidity set point at respective nodes B and E. Network frames containing Humidity Set Point publication titles are sent to nodes B and E which determine whether this information is of interest to them. Address server 44 uses Address 4 for this routing.

There are several disadvantages associated with the use of address server 44. Use of address server 44 requires that each node on network 10 establish a dialogue with address server 44 to determine which destination address to use for a particular publication title when formatting network frames. Address server 44 must be configured with the various publication titles, publishers, and subscribers. Additionally, a separate protocol needs to be developed so that nodes A through H can access address server 44. This separate protocol adds additional network frames (i.e. traffic) on network 10 resulting in slower network performance. Address server 44 acts as a single point of network system failure should address server 44 fail to operate and adds complexity to the overall design of system 10 required by having to deal with replacing address server 44 while system 10 continues to operate (e.g., hot standby or disk mirrors). Furthermore, additional network frames or traffic is required to determine when an address for a particular title is no longer in use. Finally, when each of nodes A through H power-up, they must each talk to address server 44 which can overload the network if a large quantity of nodes are present.

The present invention is directed to alleviation of the above-described problems associated with broadcast and multicast network addressing. The present invention reduces the number of unwanted messages received by nodes, allowing lower performance CPUs to be used and providing greater available CPU processing time for other tasks. The present invention also eliminates the use of an address server which reduces extra equipment, eliminates address server network frames, and eliminates the single point of failure caused by the use of an address server. Furthermore, the present invention eliminates information processing by nodes caused by the address server protocol normally present.

Figure 5:
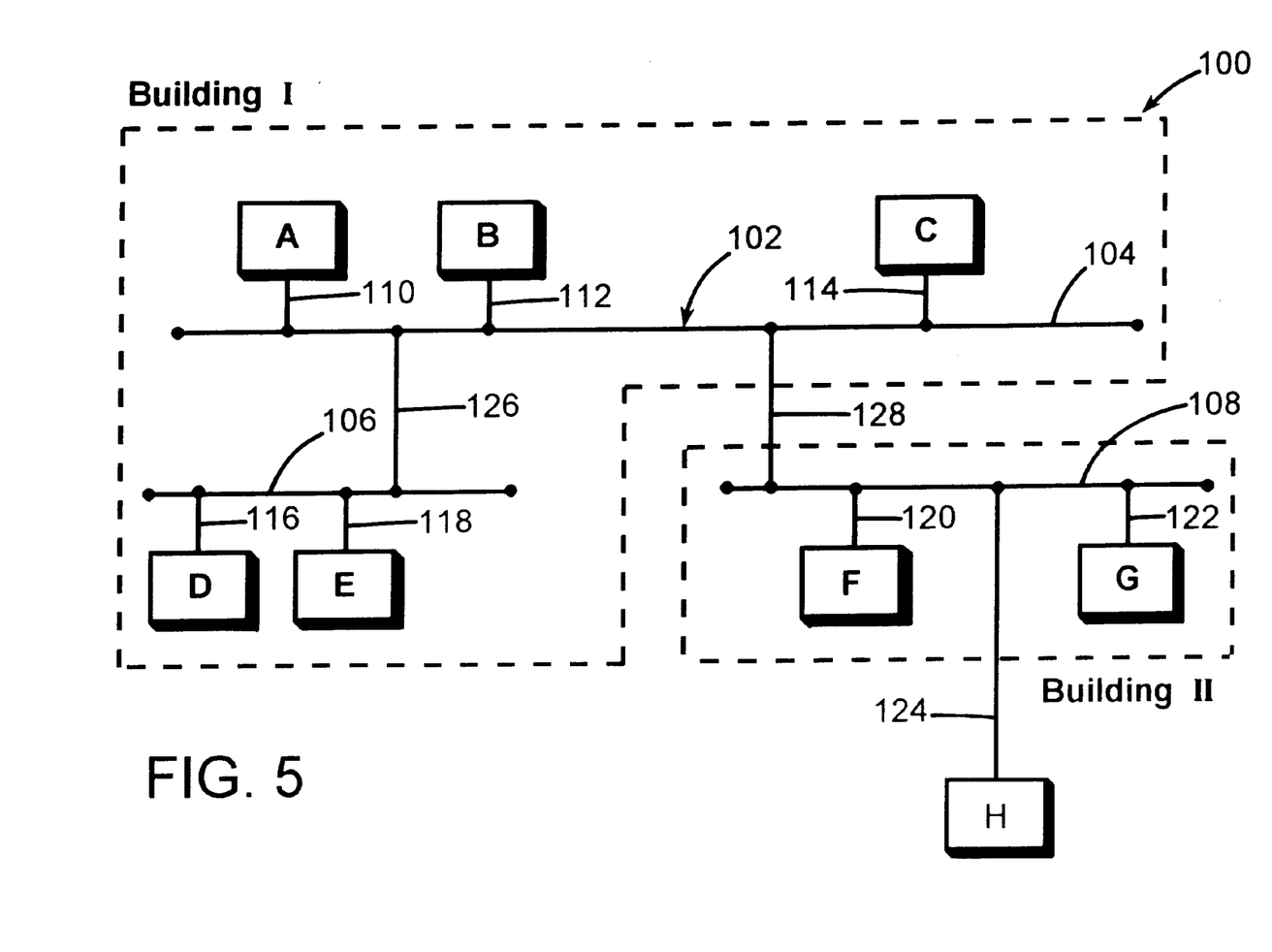
FIG. 5 is a diagram of a computer network system in accordance with the present invention.

An embodiment of a computer based network system 100 constructed in accordance with the present invention is shown in FIG. 5. Network system 100 includes a medium 102, such as coaxial cable, twisted-pair cable, satellite waves, microwaves, etc. Medium 102 includes branches 104, 106, and 108. Nodes A, B, and C are respectively connected to branch 104 via lines 110, 112, and 114 of medium 102. Nodes D and E are coupled to branch 106 via respective lines 116 and 118 of medium 102, and nodes F, G, and H are coupled to branch 108 via respective lines 120, 122, and 124 of medium 102. Nodes A through E are shown as being located in Building I and nodes F and G are shown as being located in Building II. Branches 104, 106, and 108 are coupled together via lines 126 and 128 of medium 102. Nodes A through H may be the same as those discussed above in connection with FIG. 1 or may include other things such as computers, terminals, printers, data storage devices or other types of sensors. Network system 100 is based on the above-described OSI model, shown in FIG. 2, and may use Ethernet protocol, shown in FIG. 3 and also described above. It is to be understood, however, that other protocols such as IEEE 802.3 may be used with the present invention. An address server is noticeably absent from computer network 100 and is not required by the present invention. Thus, the above-described problems associated with its use are eliminated.

Figure 6:
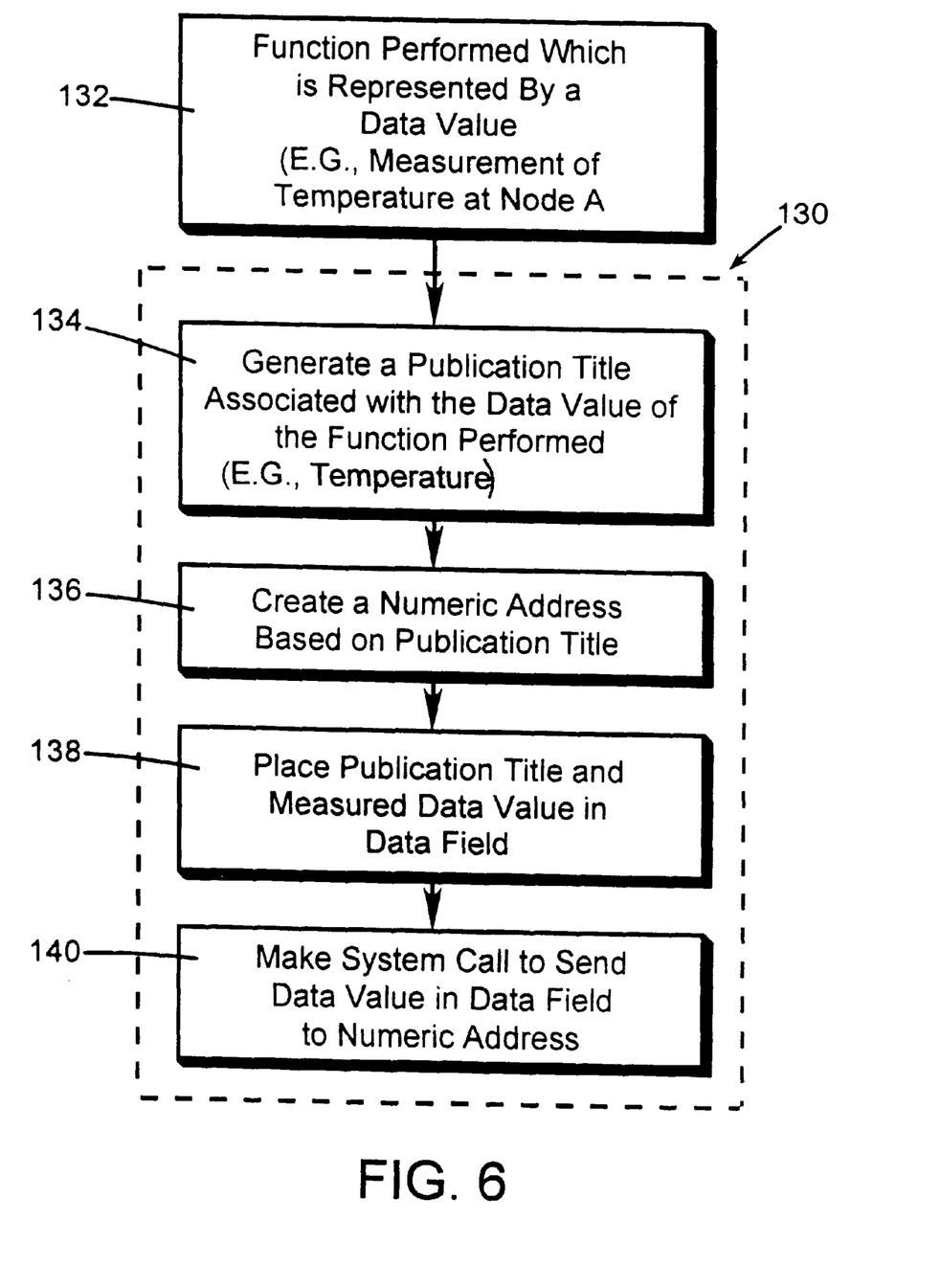
FIG. 6 is a flowchart of a software program in accordance with the present invention.

A flowchart 130 of a software program in accordance with the present invention for use by nodes A through H is shown in FIG. 6. Software programs constructed in accordance with the present invention may execute on a variety of computers and microprocessors, including Hewlett-Packard Company PA RISC computers and Motorola 68000 microprocessors. Additionally, the software program of the present invention will execute on a variety of operating systems, including Windows 95, Windows NT, and Hewlett-Packard HP-UX operating system. The software program of the present invention may also be stored on a variety of medium, including Read-Only Memory (ROM), Random-Access Memory (RAM), floppy magnetic diskettes, hard drive magnetic diskettes, CD-ROM, magnetic tape, etc.

Figure 7A:
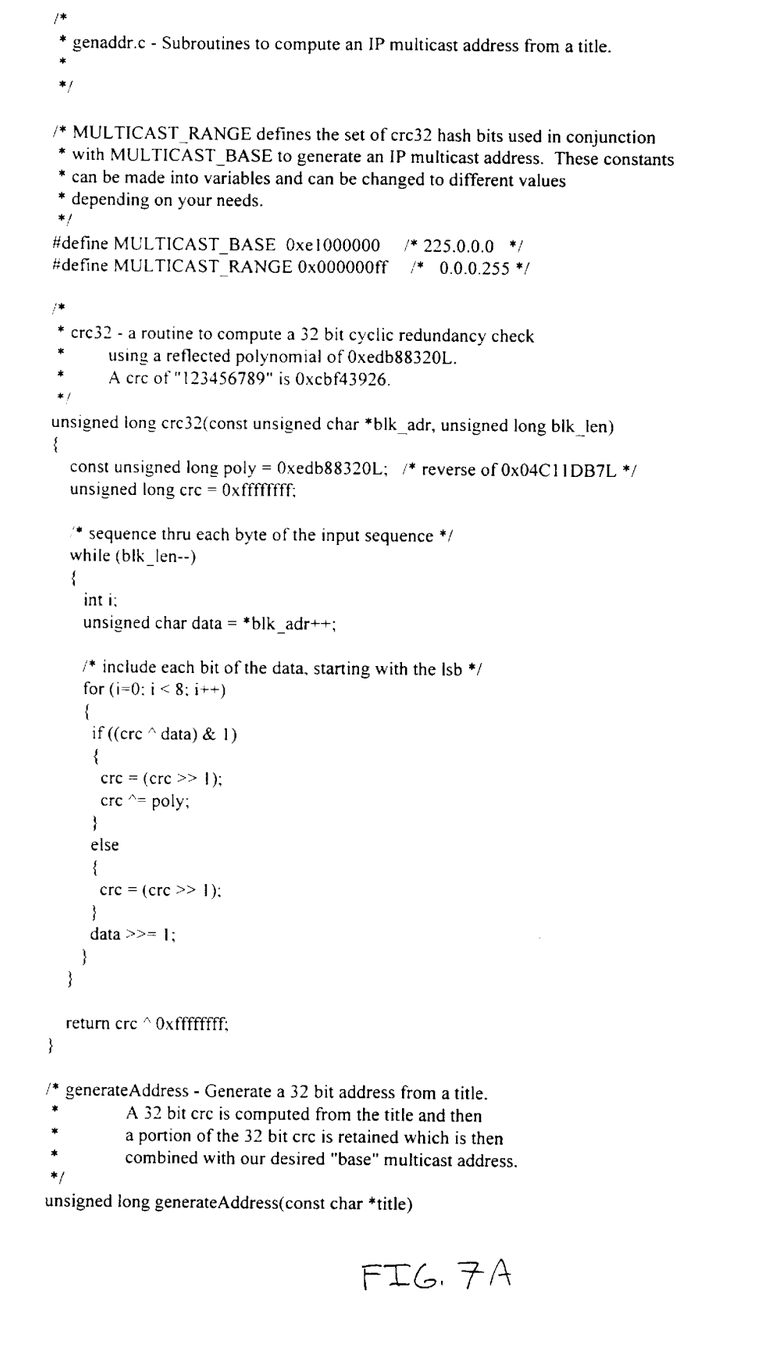
FIGS. 7A and 7B list source code in accordance with the present invention.
Figure 7B:
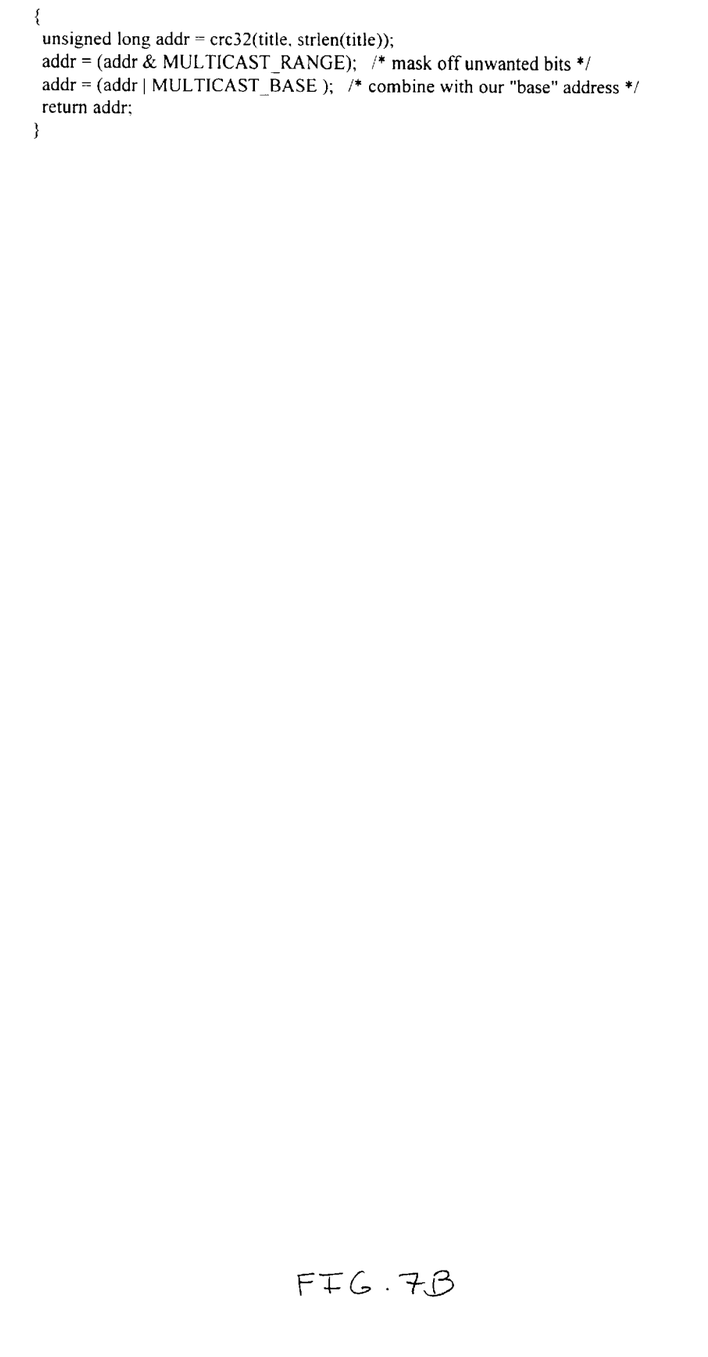

In operation, a function (e.g., temperature measurement) is performed by a node (e.g., node A) and represented by a data value, such as a certain number of degrees Celsius or Fahrenheit. This function is indicated by block 132 in FIG. 6. The software program of the present invention generates a publication title associated with this data value and the function performed. For example, for a temperature sensor located at node A, the publication title might be Temperature. This step is generally indicated by block 134 in FIG. 6. Next, the software program of the present invention generates a numeric address based on this publication title, as indicated by block 136 in FIG. 6. In accordance with an embodiment of the software program of the present invention, this numeric address is created by utilizing a cyclical redundancy check routine that produces a 32-bit address for each publication title. The least significant 8 bits of this 32-bit address may be used along with an 24-bit constant to create a multicast destination address for the HP-UX operating system. FIGS. 7A and 7B list source code written in C language to create this numeric address. Other implementations of the present invention use the 16 least significant bits in conjunction with a 16-bit constant for the Windows NT operating system. It is to be understood that other embodiments of the present invention are not limited to such implementations and that other combinations of least significant bits and constant bits may be used. It is to also be understood that other embodiments of the present invention may use means other than a cyclical redundancy check routine to produce the numeric addresses.

Figure 8A:
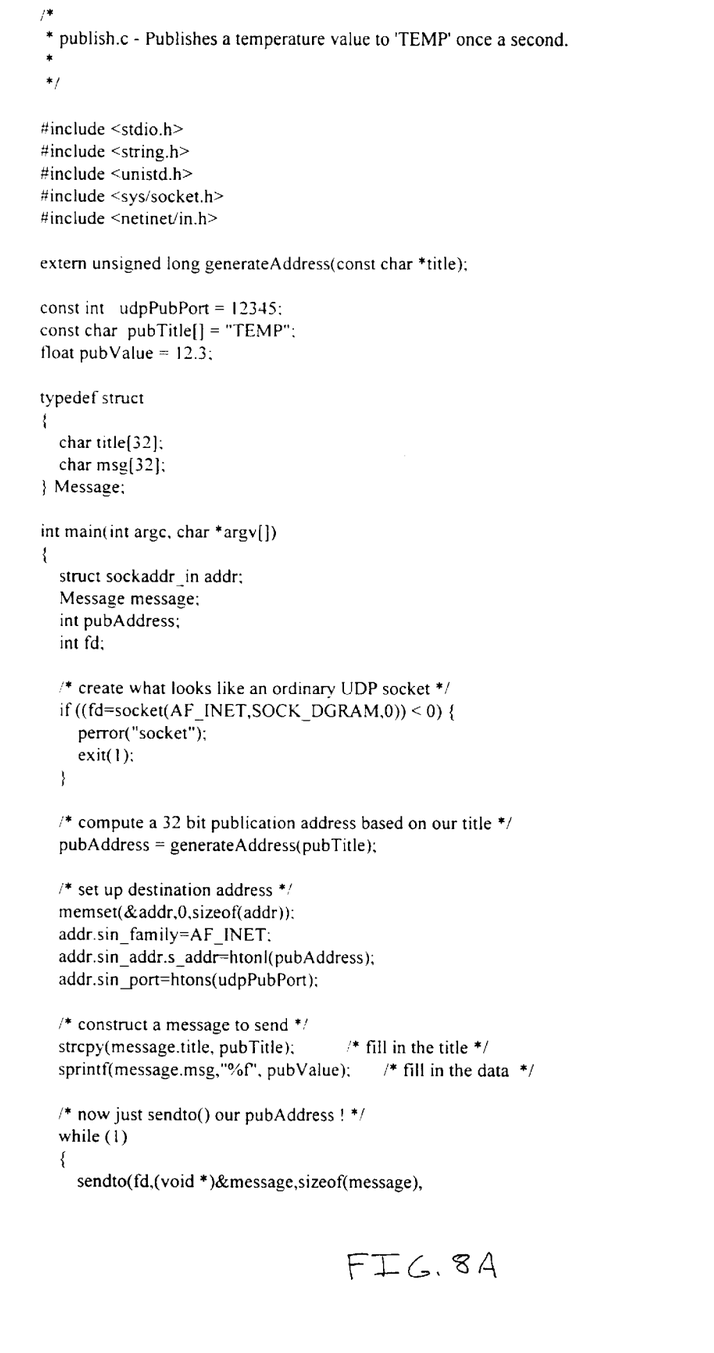
FIGS. 8A and 8B list source code in accordance with the present invention.
Figure 8B:
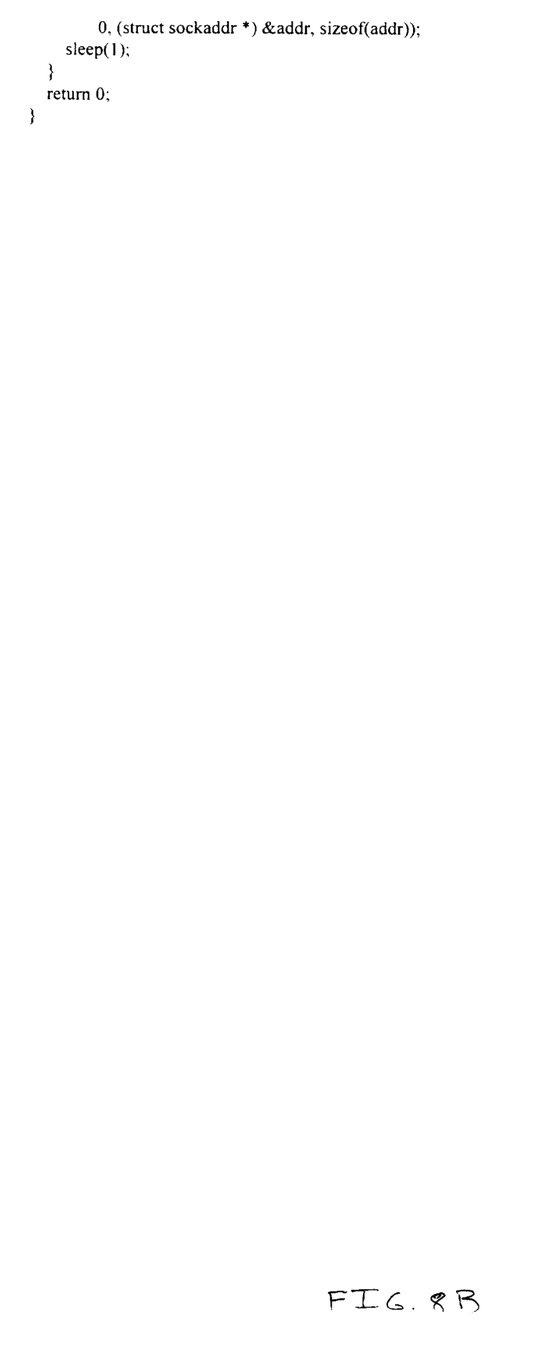

The software program of the present invention next places the publication title and measured data value in the data field of a network frame, as generally indicated by block 138 in FIG. 6. Next, the software program of the present invention makes the system call to the operating system to send the data value in the data field to the numeric address. The system in turn completes this function by, for example, loading the 32-bit address into the destination address field of an Ethernet frame. The data is then sent on to the network node(s) interested in it as more fully discussed below in connection with FIG. 9. FIGS. 8A and 8B list source code written in C language to perform the above-described publication illustrated by flowchart 130.

Figure 9:
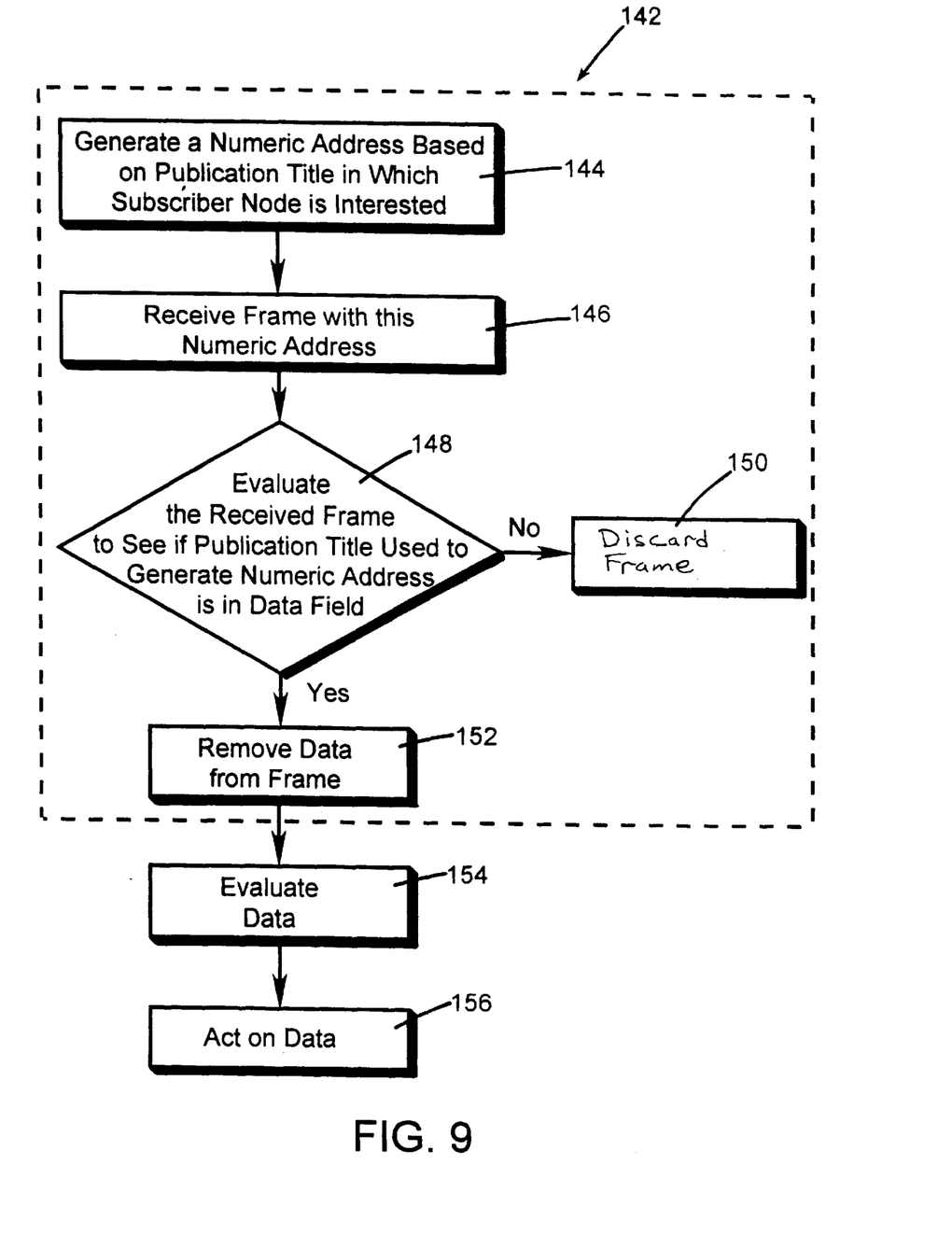
FIG. 9 is a flowchart of a software program in accordance with the present invention.

Nodes on a computer network system that want to subscribe to one or more particular network frames having publication titles and corresponding data values utilize the software program of the present invention to subscribe to such network frames. A flowchart 142 of a software program in accordance with the present invention for use by nodes A through H in subscribing to such frames is shown in FIG. 9. Each subscriber node generates a numeric address based on the desired publication title it wishes to receive, as generally indicated by block 144. For example, node C may want to receive temperature information from node A and would generate the same numeric address for this temperature information generated by node A and described above in connection with block 136 of FIG. 6. As described above, in accordance with an embodiment of the software program of the present invention, this numeric address is created by utilizing a cyclical redundancy check routine that produces a 32-bit address for each publication title. The least significant 8 bits of this 32-bit address may be used along with a 24-bit constant to create a multicast destination address for the HP-UX operating system. Other implementations of the present invention use the 16 least significant bits in conjunction with a 16-bit constant for the Windows NT operating system. As discussed above, it is to be understood that other embodiments of the present invention are not limited to such implementations and that other combinations of least significant bits and constant bits may be used. As also discussed above, it is to also be understood that other embodiments of the present invention may use means other than a cyclical redundancy check routine to produce the numeric addresses.

Figure 10A:
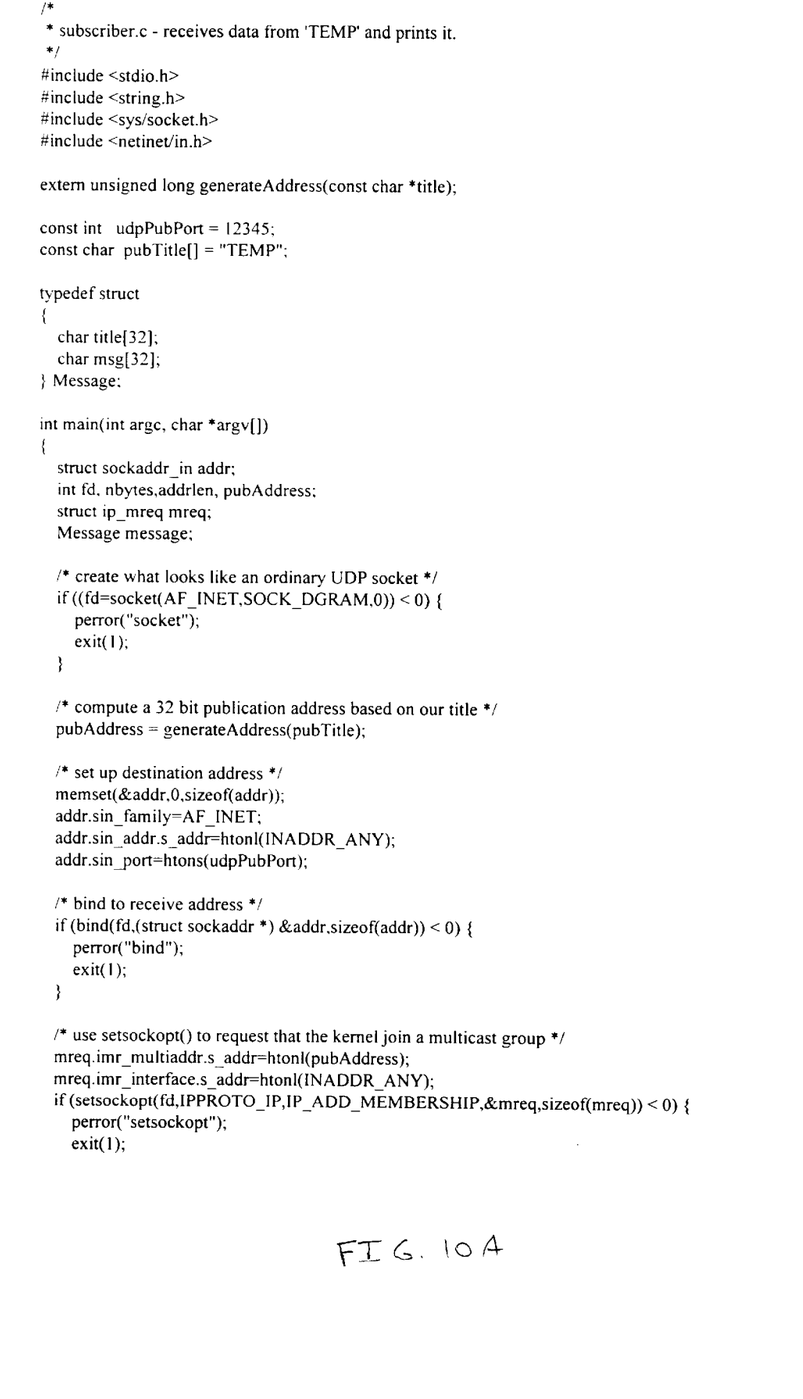
FIGS. 10A and 10B list source code in accordance with the present invention.
Figure 10B:
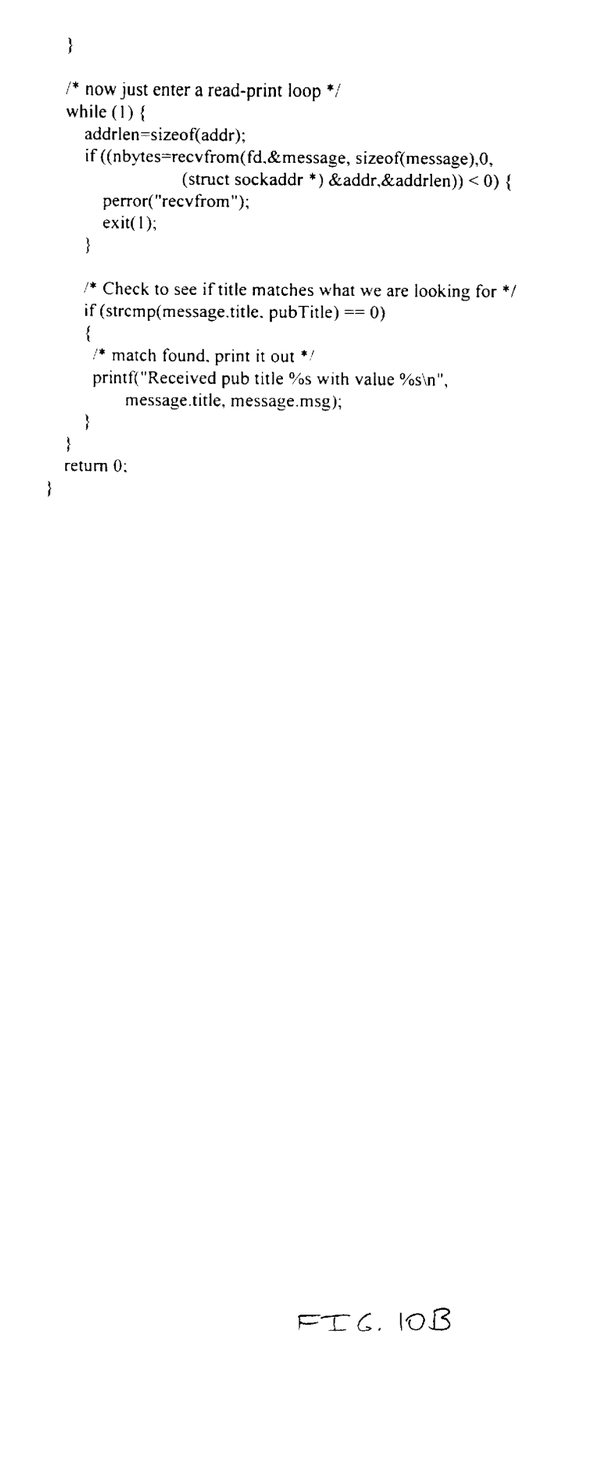

Next, the network frame with this numeric address is received by the subscriber node, as generally indicated by block 146. The software program of the present invention evaluates the received network frame to see if the publication title used to generate the numeric address is in the data field of the frame, as generally indicated by decision block 148 in FIG. 9. If the publication title used to generate the numeric address is not in the data field, the network frame is discarded, as generally indicated by block 150 in FIG. 9. If the publication title used to generate the numeric address is in the data field, the data in the network frame is removed by the software program of the present invention, as generally indicated by block 152 in FIG. 9. The data is then evaluated and acted upon as generally indicated by blocks 154 and 156 in FIG. 9. FIGS. 10A and 10B list source code written in C language to perform the above-described subscription to network frames illustrated by flowchart 142.

The software program of the present invention is designed to allow the subscriber node or nodes to respond to the network frame containing the publication title and representative data by assuming the role of a publication node where control data, (e.g., setpoint data) may be sent. For example, node C may respond to the temperature data sent by node A by sending a network frame adjusting the temperature value to a higher or lower amount.

Although the invention has been described and illustrated in detail, it is to be clearly understood that the same is intended by way of illustration and example only, and is not to be taken by way of limitation. The spirit and scope of the invention are to be limited only by the terms of the following claims.

What is claimed is:

1. A computer based network system, comprising:
   a first node having a data value;
   a medium for transmitting a network frame;
   a first node computer coupled to the medium and programmed to have a publication title associated with the data value, to generate a numeric address based on at least a portion of the publication title, to load the data value and publication title into a data field of the network frame, to load the numeric address into a destination address field of the network frame, and to send the network frame on to the destination address via the medium; and
   a second node computer coupled to the medium and programmed to have the publication title associated with the data value, to generate the numeric address based on at least a portion of the publication title, to receive from the medium the network frame with this numeric address, to evaluate the received frame to determine whether the publication title used to generate the numeric address is in the data field of the network frame, to remove the data value from the data field of the network frame when the publication title used to generate the numeric address is in the data field, and to discard the network frame when the data field of the network frame lacks the publication title used to generate the numeric address.

2. The computer based network system of claim 1, wherein the first node includes a sensor.

3. The computer based network system of claim 1, wherein the second node computer is also programmed to have a second publication title associated with a second data value, to generate a second numeric address based on at least a portion of the second publication title, to load the second data value and the second publication title into a data field of a second network frame, to load the second numeric address into a destination address field of the second network frame, and to send the second network frame on to the second destination address via the medium.

4. The computer based network system of claim 3, wherein the first node computer is programmed to have the second publication title associated with the second data value, to generate the second numeric address based on at least a portion of the second publication title, to receive from the medium the second network frame with this second numeric address, to evaluate the received second network frame to determine whether the second publication title used to generate the second numeric address is in the data field of the second network frame, to remove the second data value from the data field of the second network frame when the second publication title used to generate the second numeric address is in the data field, and to discard the second network frame when the data field of the second network frame lacks the second publication title used to generate the second numeric address.

5. The computer based network system of claim 4, wherein the second data value includes a control value that adjusts a set point of the first node.

6. The computer based network system of claim 3, further comprising a second node having the second data value.

7. The computer based network system of claim 6, wherein the second node includes a sensor.

8. The computer based network system of claim 3, wherein the network frames include Ethernet frames.

9. The computer based network system of claim 1, wherein the network frame includes an Ethernet frame.

10. A computer-readable medium including a computer software program having a set of executable modules for transmitting data on a network via a network frame, comprising:

a publication title module that generates a publication title associated with a data value;

an address module that generates a numeric address for a destination address field of the network frame based on at least a portion of the publication title; and a system call module that makes a system call to an operating system to load the data value and the publication title into a data field of the network frame, to load the numeric address into the destination address field of the network frame, and to send the network frame on to the destination address via a medium for transmitting the network frame.

11. The computer-readable medium of claim 10, wherein the software program further includes:

a receive module that receives the network frame with the destination address from the medium; and an evaluation module that evaluates the received frame with the destination address to determine whether the publication title used to generate the numeric address is in the data field of the network frame, that removes the data value from the data field of the network frame when the publication title used to generate the numeric address is in the data field, and that discards the network frame when the data field of the network frame lacks the publication title used to generate the numeric address.

12. The computer-readable medium of claim 11, wherein the network frame includes an Ethernet frame.

13. The computer-readable medium of claim 10, wherein the network frame includes an Ethernet frame.

14. A computer based networking method, the method comprising the steps of:

creating a publication title associated with a data value;

generating a numeric address based on at least a portion of the publication title;

loading the data value and publication title into a data field of a network frame;

loading the numeric address into a destination address field of the network frame; and sending the network frame on to the destination address via a network medium.

15. The computer based networking method of claim 14, further comprising the steps of:

receiving from the medium the network frame with the numeric address;

evaluating the received frame to determine whether the publication title used to generate the numeric address is in the data field of the network frame;

removing the data value from the data field of the network frame when the publication title used to generate the numeric address is in the data field; and discarding the network frame when the data field of the network frame lacks the publication title used to generate the numeric address.

* * * * *